Sept. 6, 1966 W. STEIDLER 3,270,733
CYLINDER FOR AN INTERNAL COMBUSTION ENGINE
Filed Dec. 17, 1965 2 Sheets-Sheet 1
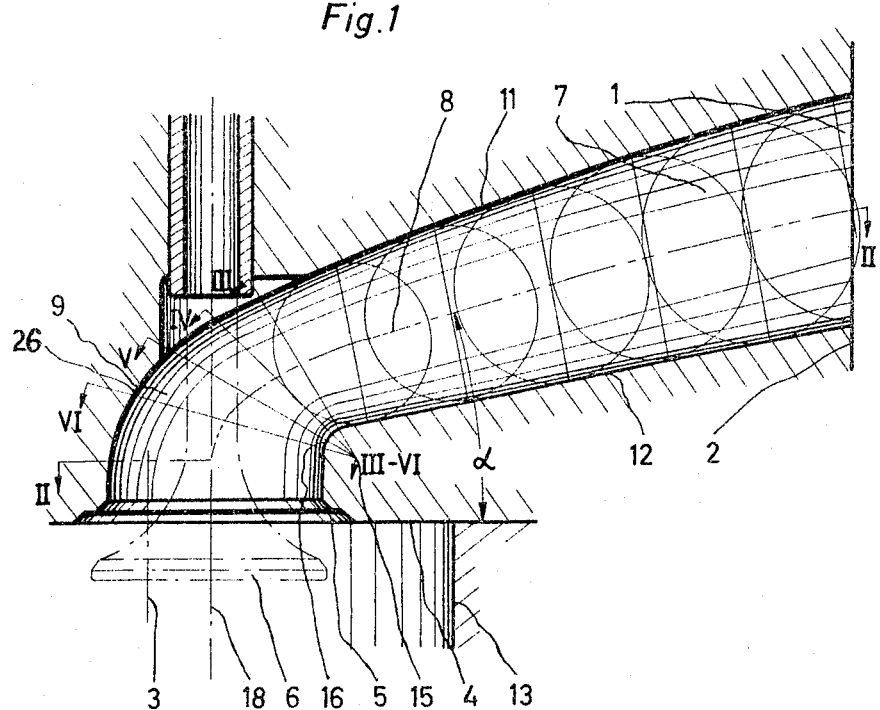
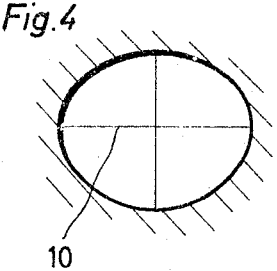
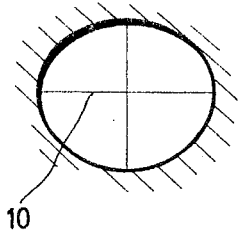

Sept. 6, 1966   W. STEIDLER   3,270,733
CYLINDER FOR AN INTERNAL COMBUSTION ENGINE
Filed Dec. 17, 1965   2 Sheets-Sheet 2
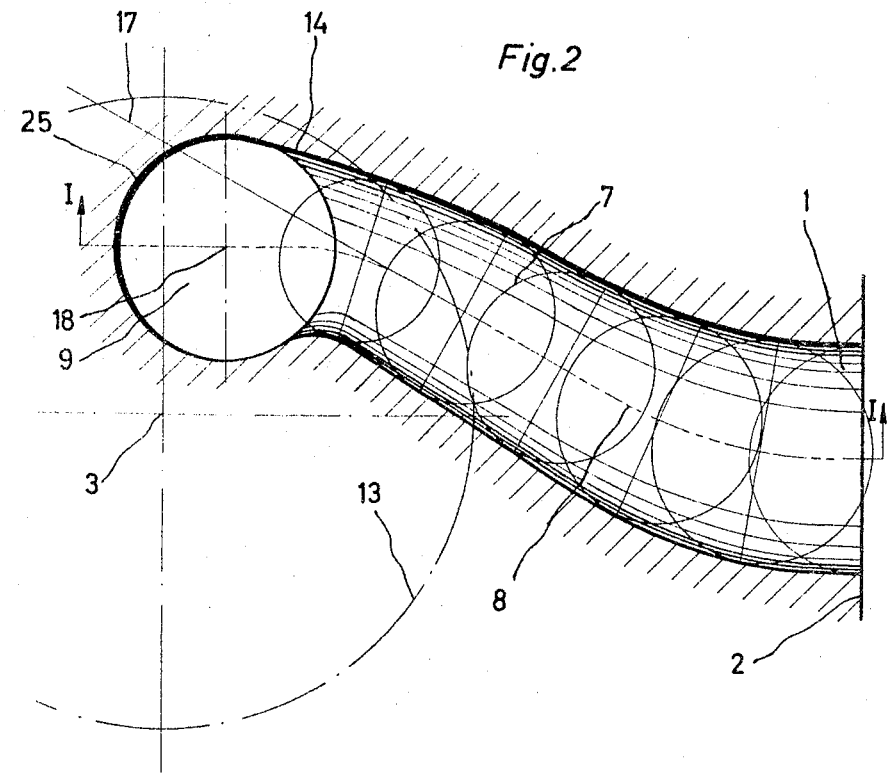
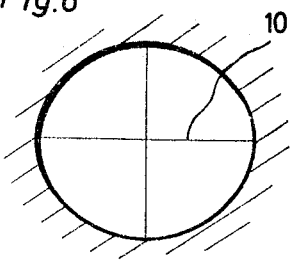 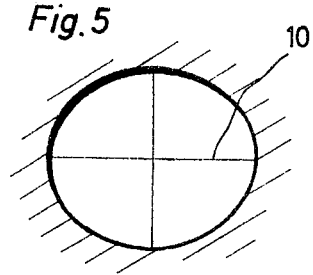

United States Patent Office 3,270,733
Patented Sept. 6, 1966

3,270,733
CYLINDER FOR AN INTERNAL COMBUSTION ENGINE
Walter Steidler, Mannheim-Feudenheim, Germany, assignor to Motoren-Werke Mannheim AG Vorm Benz ABT. Stat. Motorenbau, Mannheim, Germany
Filed Dec. 17, 1965, Ser. No. 514,520
Claims priority, application Germany, Jan. 5, 1965, M 63,700
2 Claims. (Cl. 123—188)

The invention relates to a cylinder for an internal combustion engine, especially a diesel engine with direct injection and rotational movement of the combustion air in the cylinder.

An object of the invention is to produce a rotational movement of the combustion air in the cylinder, which produces a mixture formation which is advantageous as regards mean effective pressure, fuel consumption, exhaust smoke and speed of pressure increase. According to the knowledge on which the invention is based, to obtain such an advantageous mixture formation, it is necessary to satisfy the condition that the combustion air rotates in the cylinder such that, during the injection period, its angular displacement is substantially equal to the angle of the sector between the separate fuel jets from an approximately centrally arranged multi-aperture injection nozzle.

For this purpose, the stream of air flowing into the cylinder during the suction stroke should act at a certain critical distance from the cylinder axis, at a predetermined critical angle relatively to the inside surface of the cylinder head and at a certain speed on the air mass in the cylinder, and should cause the mass to move at a certain speed of rotation. This inflow of air stops during the compression stroke, but the continued rotation of the air mass enables desired advantageous mixture formation to be obtained towards the end of the compression stroke during the injection period by each fuel jet being blown into the downstream sector of the combustion chamber, where it finds sufficient air for complete combustion.

The aforementioned critical distance is the spacing from the cylinder axis of the area centre of gravity of the inlet duct cross-section just before opening into the valve chamber. This spacing depends on the position of the centre line of the duct when viewed in an axial direction of the cylinder.

With an inlet duct inclined at a small angle to the cylinder head inside surface, the aforementioned critical angle is mainly dependent on the form of the duct cross-section just before the opening into the valve chamber. If this cross-section has a low, wide form, the critical angle is small.

The cross-section which is decisive as regards the speed at which the air stream flows into the working space is the cross-section determining the two aforesaid parameters. The inflow velocity cannot exceed a certain value if the volumetric efficiency and thus the power of the internal combustion engine are not to suffer.

An object of the invention is so to choose the four parameters, spacing of the centre of gravity, inflow angle, cross-sectional form and cross-sectional size, from the large number of possible combinations that best possible values are obtained for the aforementioned engine characteristics.

According to the present invention, there is provided a cylinder for an internal combustion engine, comprising a cylinder body, inside surface portions of said body defining a substantially cylindrical working space therein, a cylinder head closing said working space at one axial end, first portions of said cylinder head defining a lateral surface thereof directed outwardly, second portions of said cylinder head defining an inside surface thereof bounding said end of said working space, third portions of said cylinder head defining an inlet duct portion extending towards said working space from said lateral surface, fourth portions of said cylinder head defining a valve chamber to which leads said inlet duct, and fifth portions of said cylinder head defining an annular valve seat and a circular valve port encircled by said valve seat, opening into said working space at said inside surface, and in communication with said valve chamber, said valve seat and said valve port being disposed eccentrically with respect to the axis of said working space, and the cylinder having the following features:

(a) said inlet duct portion takes the form of a slimmish, symmetrical body tapering towards said working space, (b) when viewed in an axial direction of said working space, the centre line of said inlet duct portion is of bent form and a first surface portion of said valve chamber, which surface portion is radially outer with respect to the axis of said working space, extends tangentially of the inner periphery of said valve seat, (c) when viewed in a radial direction of said working space, transversely of said duct, the centre line of said inlet duct portion is approximately a straight line and extends at an angle of about 15° with respect to said inside surface, (d) when viewed in said axial direction, the width of said inlet duct portion in the vicinity of said valve chamber is less than the internal diameter of said valve seat, (e) second and third surface portions of said valve chamber, of which said second surface portion faces said valve port and said third surface portion is disposed opposite to said second surface portion, extend arcuately from said inlet duct portion of said valve port, merge with surface portions of said valve port, and become increasingly spaced apart as they approach said valve port, (f) sections, taken through said valve chamber and on planes passing through a common point in the region of the centre of an arc of said third surface portion and containing lines which extend perpendicularly to the centre line of said valve chamber and parallely to said inside surface, have approximately elliptical contours of which the major axes extend substantially perpendicularly to the working space axis, and (g) when viewed in said axial direction, a tangent to the centre line of said inlet duct portion at a first location in the vicinity of said valve chamber extends through a second location between the inner periphery of said cylinder body and the axis of said valve port.

By feature (a), the velocity of the air stream flowing into the working space is increased in as loss-free a manner as possible.

Feature (b) provides a comparatively large spacing of the area centre of gravity of the critical cross-section from the working space axis, that is to say a relatively high eddy speed with moderate throttling in the critical cross-section.

Feature (c) provides a small inflow angle, which likewise means a relatively high eddy speed with moderate throttling in the critical cross-section.

Feature (d) assists the effect of feature (b).

Feature (e) provides an inflow to the working space with smallest possible loss.

Feature (f) enables the feature (c) as initially explained to become effective.

Feature (g) causes the air entering the working space to be forced to the working space circumference, where it can, as it were, be supported. This arrangement contributes substantially to stabilising the rotation of air initiated in the cylinder.

In order that the invention may be clearly understood, and readily carried into effect, reference will now be made, by way of example, to the accompanying drawings, in which:

FIGURE 1 shows a section taken along the line I—I of FIGURE 2 through an inlet duct in a cylinder head of a diesel engine, FIGURE 2 shows a section taken along the line II—II of FIGURE 1, FIGURE 3 shows a section taken along the line III—III of FIGURE 1, FIGURE 4 shows a section taken along the line IV—IV in FIGURE 1, FIGURE 5 shows a section taken along the line V—V in FIGURE 1, and FIGURE 6 shows a section taken along the line VI—VI in FIGURE 1.

Referring to the drawings, the inlet duct extends from an inlet hole 1, which is formed in an outwardly directed lateral surface 2 of the cylinder head, to an annular inlet valve seat 5 which is situated off-centre, with respect to the working space axis 3, in an inside surface 4 of the cylinder head and which co-operates with an inlet valve closure member 6. A circular valve port 25 is encircled by the valve seat 5. Adjoining the inlet hole 1 is an inlet duct portion 7 which extends from the lateral surface 2 towards the cylindrical working space and which takes the form of a slimmish body symmetrical with respect to the centre line 8, the cross-section of the body tapering towards the working space. The different cross-sections of the inlet duct portion are circular, as indicated in FIGURES 1 and 2, where the section planes of the inscribed circles are designated by auxiliary lines which extend through the centres of the circles perpendicularly to the centre line 8. Following the inlet duct portion 7 is a valve chamber 9, of which the narrowest cross-section is seen in FIGURE 3. This cross-section corresponds to approximately 50 to 60% of the free cross-section of the valve port 25 and 50% of the cross-section of the inlet hole 1. As shown by the cross-sections in FIGURES 4, 5 and 6, the valve chamber 9 widens from the cross-section according to FIGURE 3 gradually up to the cross-section of the valve port. The top 11 and the bottom 12 of the inlet portion 7 extend outwardly into the valve chamber 9. When viewed in an axial direction of the working space, that is to say as shown in FIGURE 2, the centre line 8 is of such a bent form that a surface portion 14 of the chamber 9, which portion is radially outer with respect to the axis 3, extends tatngentially of the inner periphery of the valve seat 5. When viewed in a radial direction of the working space transversely of the inlet duct, i.e. as shown in FIGURE 1, the centre line 8 of the inlet duct portion 7 is approximately a straight line and extends at an angle α of about 15° with respect to the surface 4. When viewed as in FIGURE 2, the width of the portion 7 in the vicinity of the chamber 9 is less than the internal diameter of the valve seat 5. Top and bottom surface portions 26 and 16 of the chamber 9, of which the top portion 26 faces the port 5 and the bottom portion 16 is disposed opposite to the portion 26, extend arcuately from the portion 7 to the port 5 and become increasingly spaced apart as they approach the port. The surface portions 26 and 16 merge smoothly with surface portions of the port 5 and with top and bottom surface portions 11 and 12 of the duct portion 7. The section planes shown in FIGURES 3, 4, 5 and 6 pass through a common point 15 which lies in the region of the centre of an arc of the surface portion 16. The section planes shown in FIGURES 3, 4, 5 and 6 pass through the chamber 9 and contain lines (III—III to VI—VI in FIGURE 2) which extend perpendicularly to the centre line 8 and parallelly to the surface 4 and have elliptical contours of which the major axes 10 extend perpendicularly to the axis 3. When viewed as in FIGURE 2, a tangent 17 to the line 8 at a first location in the vicinity of the chamber 9 extends through a second location between the valve axis 18 and the inner periphery 13 of the cylinder body.

I claim:

1. A cylinder for an internal combustion engine, comprising a cylinder body, inside surface portions of said body defining a substantially cylindrical working space therein, a cylinder head closing said working space at one axial end, first portions of said cylinder head defining a lateral surface thereof directed outwardly, second portions of said cylinder head defining an inside surface thereof bounding said end of said working space, third portions of said cylinder head defining an inlet duct portion extending towards said working space from said lateral surface, fourth portions of said cylinder head defining a valve chamber to which leads said inlet duct, and fifth portions of said cylinder head defining an annular valve seat and a circular valve port encircled by said valve seat, opening into said working space at said inside surface, and in communication with said valve chamber, said valve seat and said valve port being disposed eccentrically with respect to the axis of said working space, and the cylinder having the following features:

(a) said inlet duct portion takes the form of a slimmish, symmetrical body tapering towards said working space, (b) when viewed in an axial direction of said working space, the centre line of said inlet duct portion is of bent form and a first surface portion of said valve chamber, which surface portion is radially outer with respect to the axis of said working space, extends tangentially of the inner periphery of said valve seat, (c) when viewed in a radial direction of said working space transversely of said duct, the centre line of said inlet duct portion is approximately a straight line and extends at an angle of about 15° with respect to said inside surface, (d) when viewed in said axial direction, the width of said inlet duct portion in the vicinity of said valve chamber is less than the internal diameter of said valve seat, (e) second and third surface portions of said valve chamber, of which said second surface portion faces said valve port and said third surface portion is disposed opposite to said second surface portion, extend arcuately from said inlet duct portion to said valve port, merge with surface portions of said valve port, and become increasingly spaced apart as they approach said valve port, (f) sections taken through said valve chamber and on planes passing through a common point in the region of the centre of an arc of said third surface portion and containing lines which extend perpendicularly to the centre line of said valve chamber and parallelly to said inside surface, have approximately elliptical contours of which the major axes extend substantially perpendicularly to the working space axis, and (g) when viewed in said axial direction, a tangent to the centre line of said inlet duct portion at a first location in the vicinity of said valve chamber extends through a second location between the inner periphery of said cylinder body and the axis of said valve port.

2. A cylinder according to claim 1, wherein said inlet duct portion is of circular cross-section.

References Cited by the Examiner

UNITED STATES PATENTS

| | | | |
|---|---|---|---|
| 1,977,127 | 10/1934 | Guernsey. | |
| 2,921,571 | 1/1960 | Vogel et al. | 123—188 |
| 3,045,655 | 7/1962 | Formia | 123—191 X |
| 3,125,075 | 3/1964 | Wittek | 123—30.2 |
| 3,145,696 | 8/1964 | Baster | 123—188 X |

FOREIGN PATENTS

| | | |
|---|---|---|
| 1,015,269 | 9/1957 | Germany. |
| 497,498 | 12/1938 | Great Britain. |
| 881,089 | 11/1961 | Great Britain. |

MARK NEWMAN, *Primary Examiner.*

A. L. SMITH, *Assistant Examiner.*